United States Patent Office 3,471,384
Patented Oct. 7, 1969

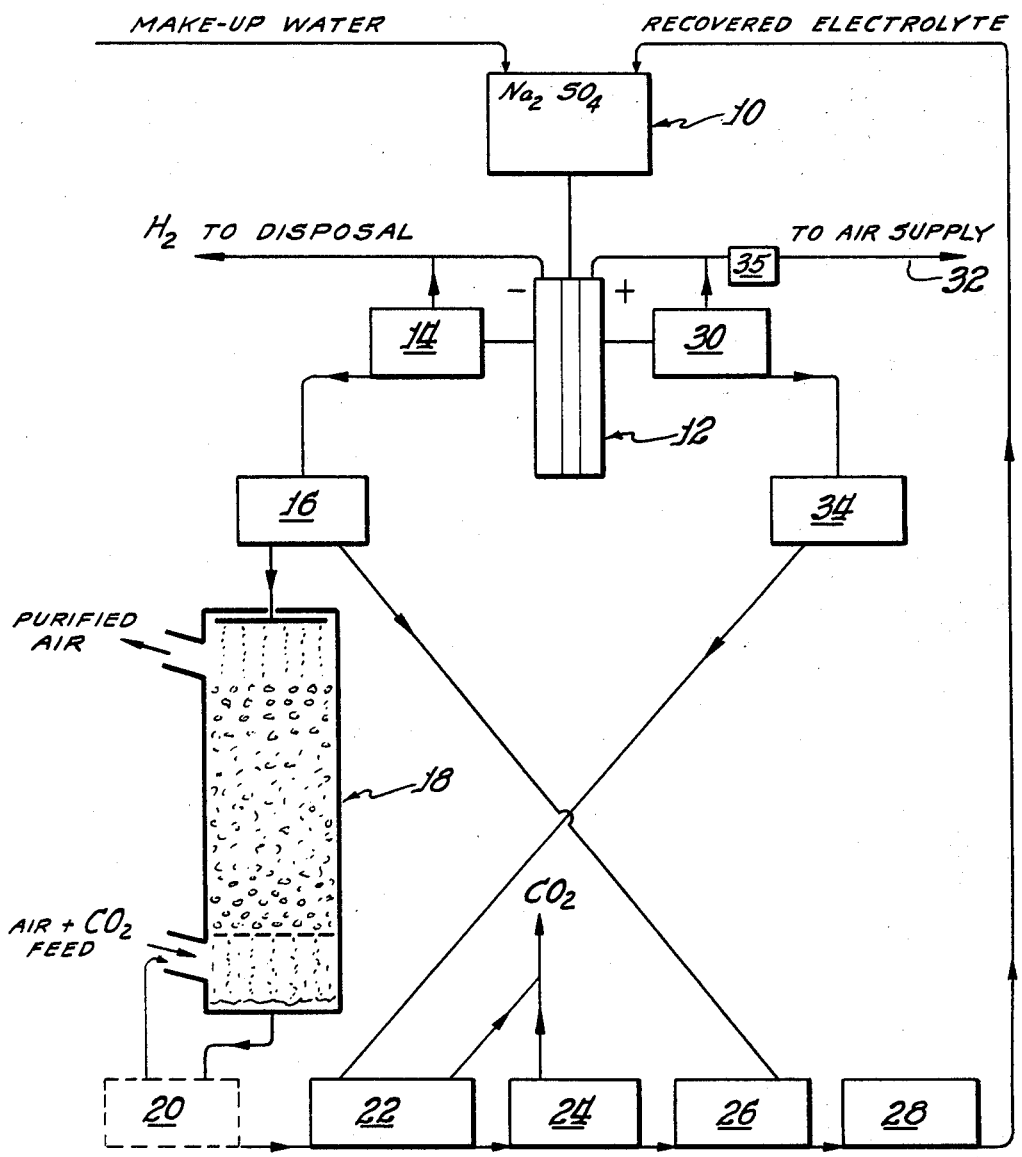

3,471,384
ELECTROLYTIC METHOD OF OXYGEN
GENERATION
Clarence E. Albertson, Villa Park, Ill., assignor to Borg-Warner Corporation, Chicago, Ill., a corporation of Illinois
Filed Aug. 11, 1965, Ser. No. 478,797
Int. Cl. B01k 1/00; C01b 13/04
U.S. Cl. 204—129                                           3 Claims

ABSTRACT OF THE DISCLOSURE

Method of generating and adding oxygen to an enclosed atmosphere and removing carbon dioxide from the enclosed atmosphere whereby an aqueous solution of an electrolytically stable salt is electrolyzed in a diaphragm cell to produce a base and hydrogen at the cathode and an acid and oxygen at the anode and passing the base solution to an air scrubber to pick up carbon dioxide carried by the air within the enclosed atmosphere.

---

This invention relates to a process and apparatus for the maintenance of suitable respiration atmospheres and more particularly to the generation and addition of oxygen to an enclosed atmosphere and removal of carbon dioxide from the enclosed atmosphere.

Prior to this invention, respiration oxygen requirements were furnished in enclosed chambers such as submarines, spacecraft, aircraft, etc. by removing the carbon dioxide and replacing it with oxygen. Normally, the oxygen was supplied either from a tank of liquefied or pressurized oxygen or by chemically generating the oxygen within the enclosed space. The supplemental oxygen was, of course, necessary to maintain an atmosphere suitable for human breathing of the air. The chemically generated oxygen was generally obtained from such sources as potassium superoxide or sodium chlorate-iron mixtures, catalytically decomposing oxygen-rich compounds, such as hydrogen peroxide, or electrolyzing water. Also, oxygen was provided by the electrolysis of certain alkali metal or alkaline earth metal carbonates either fused or dissolved in inert fused solvents. The carbon dioxide was removed in a separate step by regenerative absorption as with lithium hydroxide or potassium superoxide or by absorption-desorption procedures using ethanolamines, carbonate solutions, or the like. Thus, a low concentration of carbon dioxide was maintained in the air within the enclosed space. When the amines were used, it was necessary to take special precautions to prevent the amines from entering the air stream.

The aforementioned prior methods of providing oxygen and removing carbon dioxide from enclosed atmospheres to maintain a suitable breathing environment, were subject to certain inherent disadvantages such as complexity, weight, and inefficiency. Also, two separate processes had to be operated simultaneously with careful control to balance the carbon dioxide and oxygen within the enclosed space.

The present invention is directed to a method and apparatus for the generation and addition of oxygen and the simultaneous removal of carbon dioxide from an enclosed atmosphere utilizing the same apparatus for both functions.

Generally stated, the present invention utilizes a diaphragmed electrolytic cell containing an electrolytically stable aqueous salt electrolyte which will generate hydrogen and a base at the cathode and oxygen and an acid at the anode. The oxygen is utilized to replenish depleted air in the enclosed atmosphere. The base is utilized to combine with excess carbon dioxide in the air within the enclosed atmosphere and form a carbonate. The acid is utilized to convert the carbonate that is formed to a salt while evolving carbon dioxide. The carbon dioxide formed is vented from the enclosed atmosphere.

The aqueous salt solution used to generate oxygen may be, for example, a solution of sodium sulfate which is electroylzed within the diaphragmed cell to form an acid and a base ($H_2SO_4$ and $NaOH$ respectively). In the electrolysis of the salt solution, hydrogen and oxygen are released at the electrodes, oxygen at the anode, where acid forms, and hydrogen at the cathode, where the base forms.

The oxygen may be collected and stored for use as needed or alternatively emptied directly into the enclosed atmosphere. The sodium hydroxide formed and collected at the cathode, along with the hydrogen, is used to absorb carbon dioxide from the air using an absorption column. The absorbed carbon dioxide is released from the basic solution by neutralizing the caustic-carbonate solution with sulfuric acid formed at the anode by electrolysis. The sodium sulfate salt solution formed in this step is re-electrolyzed and the cycle is repeated with only a loss of water which forms the oxygen and hydrogen. The hydrogen and carbon dioxide which are the rejected by-products of this process may be pumped out of the enclosed atmosphere. The reaction steps are as follows:

In the electrolytic cell:

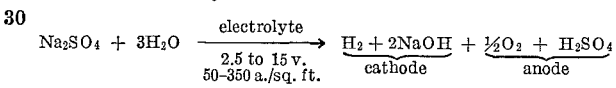

In the absorber:

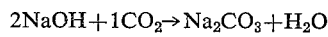

In the neutralizer:

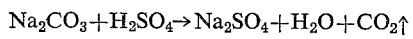

It will be noted that two oxygen atoms are removed as carbon dioxide for each oxygen atom generated, i.e., one-half of the caustic generated is required to remove carbon dioxide. Thus, an adequate supply of caustic is provided for the removal of carbon dioxide generated by respiration within the enclosed atmosphere or space.

The advantages of this invention will become apparent upon consideration of the detailed description taken in conjunction with the accompanying drawing in which:

The figure is a flow diagram setting forth the apparatus utilized in an electrolytic cycle for producing oxygen and removing carbon dioxide from an enclosed atmosphere or space.

Referring now to the drawing, there is shown an aqueous salt solution electrolyte source depicted as chamber 10. The salt solution within chamber 10 is one which will not decompose when electrolyzed in water and whose cation forms soluble hydroxides, bicarbonates and carborates. The specific salt shown for illustration is sodium sulfate. The aqueous salt solution within chamber 10 is in fluid communication with and is directed into a diaphragmed electrolytic cell 12. An electrical current of from about 3 to about 15 volts and about 50 to about 350 amperes per square foot is applied to the cell 12 (the line is not shown). Hydrogen is generated at the cathode along with sodium hydroxide, and oxygen and sulfuric acid are generated at the anode. All of the sodium sulfate is not converted to sodium hydroxide and sulfuric acid, and the base and acid solutions generated by electrolysis will contain a portion of sodium sulfate or sodium bisulfate as the case may be.

With respect to the cathode side of the cell, the sodium hydroxide-sodium sulfate solution is in fluid communication with and passed to a solution degassing device 14 and hydrogen is vented from the degasser as a by-product. Hydrogen is also vented from the cathode side of the cell as shown. The sodium hydroxide-sodium sulfate solution in the degassing device 14 is in fluid communication with and passed to base collection chamber 16. A portion of the sodium hydroxide-sodium sulfate solution is slowly passed from the collection chamber 16 through an air scrubber 18, consisting of a column containing inert particulate matter, such as vermiculite, where it picks up carbon dioxide to form sodium carbonate plus water. The portion of the sodium hydroxide-sodium sulfate solution passed through the air scrubber is in fluid communication with and thus emptied into a solution degassing device 20 where the excess air is removed, and this air in turn is passed upwardly through the air scrubber 18 and into the enclosed atmosphere as purified air. The sodium hydroxide-sodium bicarbonate or sodium carbonate is in fluid communication with and passed into an acidifying chamber 22 wherein sulfuric acid-sodium sulfate solution is added from an acid collection chamber 34 on the anode side of the electrolytic cell 12. The pH of the carbonate solution is adjusted down to about 4.2 to decompose the carbonate or bicarbonate and produce sodium sulfate (salt) plus water and carbon dioxide. The carbon dioxide is vented from the enclosed atmosphere or space which is being furnished with purified air, i.e., the carbon dioxide is vented from the acidifying chamber 22 as shown. The salt solution in the acidifying chamber 22 is in fluid communication with a solution degassing device 24 where the remaining portion of the carbon dioxide is vented as shown. The sodium sulfate solution is passed from the degassing device 24 to a neutralizing chamber 26 where the pH is adjusted to about 7 by addition of sodium hydroxide-sodium sulfate solution from the base collection chamber 16. The solution is cooled by a cooling device 28 and returned to the electrolyte chamber 10 where it serves as a source of electrolyte for the diaphragmed cell 12.

Referring now to the anode side of the diaphragmed electrolytic cell, oxygen is formed along with sulfuric acid. A portion of the oxygen is vented directly from the electrolytic cell 12 to the enclosed atmosphere through a demisting device 35.

The sulfuric acid-sodium sulfate solution within cell 12 is in fluid communication with and passed to a degassing device 30 where the oxygen is removed and either passed to a storage vessel for future use or to the enclosed atmosphere for immediate use.

The sulfuric acid-sodium sulfate solution is stored in an acid storage chamber 34 where it is used to acidify the carbonated solution from the air scrubber in acidifying chamber 22.

As mentioned above, any salt that may be decomposed when electrolyzed in water and whose cation forms soluble hydroxides and carbonates, is useful in the aforementioned system. For example, the alkali metal salts such as potassium, sodium, cesium, rubidium, and lithium, may be utilized when the anions are stable, i.e., when water is decomposed to oxygen, in preference to the anion of the salt. Fully oxidized anions such as the sulfates, phosphates, chromates, nitrates, tetraborates and the like are useful. From an economical standpoint, the sulfates are preferred.

With respect to the electrolytic cell utilized in the aforementioned process, it will be noted that it is necessary that the cell contain a semi-permeable membrane (not shown) to reduce interaction between the acid and base solutions formed by electrolysis. A single membrane cell may be used if the aqueous salt solution is metered into each cell compartment, however, for a more efficient separation of acid and base, dual or multiple membrane cells are preferred. It has been found that ion exchange membranes may be used to further reduce the interaction of acid and base within the cell.

It should be understood that while this invention has been described in connection with certain specific apparatus as well as a specific method of generating oxygen and removing carbon dioxide, that this is by way of illustration and not by way of limitation and that the scope of the invention is defined solely by the appended claims which should be construed as broadly as is consistent with the prior art.

What is claimed is:

1. A method of generating oxygen in and removing carbon dioxide from an enclosed respiration atmosphere containing air, comprising the steps of:

passing electricity through an aqueous solution of an electrolytically stable salt in a diaphragmed electrolytic cell to produce a base plus hydrogen at the cathode and an acid plus oxygen at the anode;

venting the hydrogen from the enclosed atmosphere and injecting the oxygen into the enclosed space;

passing the base solution through an air scrubber to pick up carbon dioxide carried by the air within the enclosed atmosphere passed therethrough to thereby form a carbonate-base solution;

neutralizing said carbonate-base solution formed as a result of the base plus carbon dioxide uniting within the air scrubber to release carbon dioxide therefrom;

venting said carbon dioxide from said enclosed atmosphere; and adding acid passed from the anode in said cell, to the carbonated-base solution to eliminate the carbon dioxide and to form a salt solution and recycling the salt solution to the electrolytic cell.

2. A method of generating oxygen in and removing carbon dioxide from an enclosed respiration atmosphere containing air comprising the steps of:

passing from about 2.5 to about 20 volts and from about 50 to about 350 amperes/square foot of electrode area of electricity though a solution of an electrolytically stable salt in a diaphragmed electrolytic cell to form a base plug hydrogen at the cathode and an acid plus oxygen at the anode;

venting the hydrogen from the base and out of the respiration atmosphere and passing the oxygen from the anode into the environment of the enclosed respiration atmosphere;

passing the base solution through an air scrubber to combine carbon dioxide carried by the air with the base to form a carbonate;

neutralizing the carbonate solution by adding acid thereto from the anode to release carbon dioxide;

venting the carbon dioxide from the enclosed atmosphere; and adding additional acid from the anode in said cell to said carbonated-base solution to form a salt solution and recycling the salt solution to the electrolytic cell.

3. A method of generating oxygen in and removing carbon dioxide from an enclosed respiration atmosphere containing air comprising the steps of:

passing from 2.5 to 20 volts and from about 50 to 350 amperes/sq. ft. of electricity through a sodium sulfate water solution in a diaphragmed electrolytic cell to produce sodium hydroxide plus hydrogen at the cathode and sulfuric acid plus oxygen at the anode;

venting the hydrogen generated at the cathode from the enclosed atmosphere and passing oxygen from the anode into the enclosed atmosphere;

passing the sodium hydroxide formed at the cathode through an air scrubber to pick up carbon dioxide carried by the air in the enclosed atmosphere, thereby to form sodium bicarbonate;

neutralizing said sodium bicarbonate solution by adding sulfuric acid formed at the anode, to thereby release carbon dioxide from the solution;

venting said carbon dioxide from the enclosed atmosphere; and adding sufficient sulfuric acid from the anode to the sodium bicarbonate solution to form sodium sulfate salt solution and recycling the salt solution to the electrolytic cell.

References Cited

UNITED STATES PATENTS

| | | | |
|---|---|---|---|
| 2,726,930 | 12/1955 | Edwards et al. | 204—129 X |
| 2,829,095 | 4/1958 | Kenichi Oda et al. | 204—98 |
| 3,079,237 | 2/1963 | Taylor | 23—209.5 |
| 3,135,673 | 6/1964 | Tirrell et al. | 204—98 |
| 3,242,058 | 3/1966 | Ganley et al. | 202—176 |
| 3,344,050 | 9/1967 | Mayland et al. | 204—98 |

JOHN H. MACK, Primary Examiner

H. M. FLOURNOY, Assistant Examiner

Dedication 3,471,384.—*Clarence E. Albertson*, Villa Park, Ill. ELECTROLYTIC METHOD OF OXYGEN GENERATION. Patent dated Oct. 7, 1969. Dedication filed May 24, 1972, by the assignee, *Borg-Warner Corporation*.

Hereby dedicates to the People of the United States the entire remaining term of said patent.

[*Official Gazette August 15, 1972.*]